United States Patent [19]
Clynne et al.

[11] Patent Number: 5,994,702
[45] Date of Patent: Nov. 30, 1999

[54] METHOD AND APPARATUS FOR COLD SHIELDING

[75] Inventors: Thomas H. Clynne, Oriskany; Lawrence W. Bossert, New Hartford; Jonathan P. Knauth, Sauquoit; Michael L. Robinson, Utica, all of N.Y.

[73] Assignee: Infrared Components Corporation, Utica, N.Y.

[21] Appl. No.: 09/020,634

[22] Filed: Feb. 9, 1998

[51] Int. Cl.⁶ .................................................. G01J 5/06
[52] U.S. Cl. ................................................... 250/352
[58] Field of Search ....................................... 250/352

[56] References Cited

U.S. PATENT DOCUMENTS 5,196,106  3/1993  Du Pree et al. .
5,225,931  7/1993  Stavroudis ............................... 359/601
5,277,782  1/1994  Du Pree et al. .
5,315,116  5/1994  Du Pree et al. .
5,371,369  12/1994  Kent ........................................ 250/352

*Primary Examiner*—Constantine Hannaher
*Assistant Examiner*—Albert Gagliardi
*Attorney, Agent, or Firm*—August E. Roehrig, Jr.; Hancock & Estabrook, LLP

[57] ABSTRACT

A method of making and a bellows cold shield wherein only the focused IR energy from the optical system of an IR detector will reach the detector or focal plane array, FPA, and all other radiation will be redirected from reaching the FPA through the use of a bellows cold shield having a predetermined geometrical surface which reflects the undesired light energy away from the FPA, and a microrough interior surface of this geometrical shape which absorbs any of the undesired light energy which is not so reflected away.

20 Claims, 2 Drawing Sheets

METHOD AND APPARATUS FOR COLD SHIELDING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

This invention relates in general to infrared (IR) absorbent shielding, sometimes referred to as cold shielding, and, in particular, to a method of IR shielding which utilizes macro and microscopic geometries to eliminate stray and other unwanted radiation from reaching an IR detector such as a focal plane array (FPA) to thereby improve the operation thereof More specifically, but without restriction to the particular embodiment and/or use which is shown and described herein for purposes of illustration, this invention relates to the use of a geometric design utilizing surface reflection for selectively redirecting unwanted or stray IR radiation from the IR detector, and an IR absorbent coating on the interior of the geometric design to absorb any unwanted or stray IR radiation which passes through the geometric design or is reflected within the interior after first striking an interior surface.

2. Description of Related Art

Cold shielding is used in an IR system to allow only the desired IR radiation to be collected and focused by the optics of the system onto the IR detector or FPA. Possible sources of stray radiation which can affect the performance of the system include "off axis" objects and sources generated within the optics. Because an IR system detects and images heat, great effort must be taken to ensure that the system is protected from any source of such stray radiation "noise" that can affect its operation.

Protection against stray radiation which will cause erroneous signal detection is extremely difficult because all objects at temperatures above absolute zero emit IR radiation dependent upon their temperature and surface emissivity. Ideally, cold shields have a very low mass to aid in dynamic stability and to minimize their cool down times. In addition, an ideal cold shield must have a low emissivity exterior which will reduce the radiant parasitic heat load on the system, and will be designed such that only focused IR energy from the system optics will reach the detector. Unwanted IR energy must be reflected away from the FPA, or absorbed within the system before reaching the FPA, to insure an accurate signal detection.

One approach to improving the accuracy of IR signal detection is to use baffles placed at periodic intervals along the optical path formed between the exit pupil of the optical system and the IR detector (FPA) where the image is formed. Such an approach is described in U.S. Pat. Nos. 5,277,782 and 5,315,116. Such baffles are designed to approximate the shape of the optical "bundle" as it forms an image. Any radiation outside of the optical bundle is reflected into a cavity or re-directed out of the system by means of surface reflection which can be predicted by means of an optical ray trace. Such baffles are inserted during the manufacturing process which greatly complicates the fabrication procedure and generally results in an increase in the thermal mass of the cold shield.

The ability of a cold shield to reduce the amount of reflected energy can be improved by the utilization of a high emissivity coating which will absorb, rather than reflect, the radiation. The absorption of the system can be improved by providing a rough surface for such a high emissivity coating. One such method of roughening the surface known to those skilled in the art is referred to as "Orlando Black" or "Martin Black". Another method of roughening the surface is by creating small cavities on the surface of the mandrel used in the electroforming process for creating a cold shield by sandblasting the mandrel to roughen its surface before anodizing, as described in U.S. Pat. No. 5,196,106.

Another attempt to increase the efficiency of a cold shield is described in U.S. Pat. No. 5,298,752, which utilizes tiny retroreflectors on the interior surface of the cold shield to redirect the IR energy striking the retroreflector back in the direction from which it came.

The present invention provides a method and an apparatus for redirecting incoming light energy so that only the focused IR energy from the optical system will reach the detector or FPA, and all other radiation will be redirected from reaching the FPA through the use of a predetermined geometrical surface which reflects the undesired light energy away from the FPA, and a microrough interior surface of this geometrical shape which absorbs any of the undesired light energy which is not so reflected away.

SUMMARY OF THE INVENTION

It is, therefore, an object of this invention to improve cold shields and the method of making a cold shield for an IR detector.

Another object of this invention is to improve cold shields by minimizing the amount of stray radiant energy outside a predetermined optical path which impinges on an IR detector, or FPA.

A further object of this invention is to reflect stray radiant energy outside of the optical path of an IR detector from the FPA of the detector.

Still another object of this invention is to absorb any stray radiant energy outside of the optical path of an IR detector to prevent such stray radiant energy from impinging on the FPA of the detector.

Yet another object of this invention is to first reduce stray radiant energy outside the optical path of an IR detector from impinging on the FPA of the detector by reflecting such unwanted energy from the FPA, and then through the use of an increased emissivity interior of the reflecting system, absorbing any stray radiant energy which is not so reflected from the detector.

These and other objects are attained in accordance with the present invention wherein there is provided a method of making and a bellows cold shield wherein only the focused IR energy from the optical system of an IR detector will reach the detector or FPA, and all other radiation will be redirected from reaching the FPA through the use of a cold shield having a predetermined geometrical surface which reflects the undesired light energy away from the FPA, and a microrough interior surface of this geometrical shape which absorbs any of the undesired light energy which is not so reflected away.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These embodiments of the invention may now be better understood by referring to the following detailed description of the invention wherein the illustrated embodiments are described in detail.

DETAILED DESCRIPTION OF THE INVENTION

Throughout this description, the preferred embodiments and examples shown should be considered as exemplars, rather than limitations on the apparatus and methods of the present invention.

Figure 1:
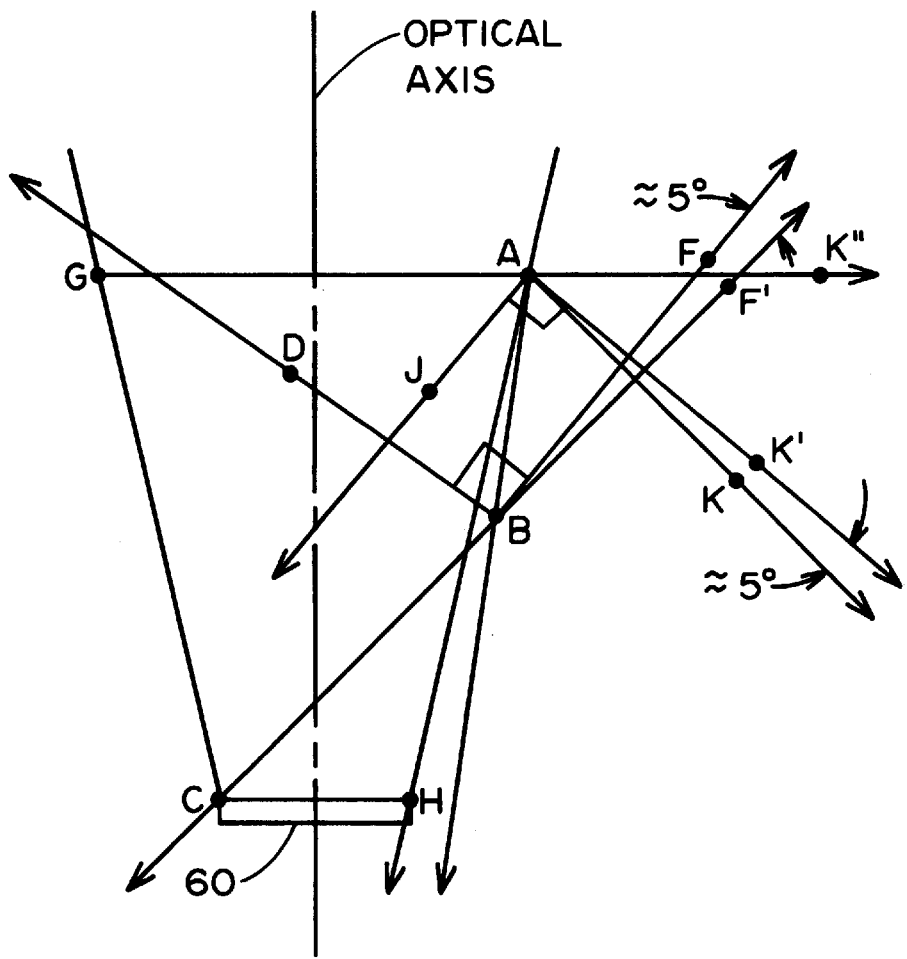
FIG. 1 is a ray trace diagram to illustrate one embodiment of designing a predetermined geometrical surface to redirect unwanted IR energy from reaching the FPA by reflecting the undesired light energy away from the FPA.

Referring now to the drawings, there is illustrated in FIG. 1 a diagram of a ray trace to illustrate the manner in which a cold shield is constructed in order to reflect or redirect unwanted IR energy from reaching a FPA 60 by reflecting the undesired light energy away from the FPA 60.

The first method, illustrated by FIG. 1, is a purely geometric approach to prevent IR energy outside of the optical path from illuminating the detector or FPA 60 by means of a single bounce reflection. For clarity of illustration, only one portion of the optical path will be referred to in detail. In is to be understood, however, that the optical path is defined by the lines GC and AH, and the FPA 60, with the optical axis being a ray perpendicular to the FPA 60 and equidistant from the ends thereof. The desired geometry for forming the cold shield is determined by projecting a ray AB just outside of the optical path AH. By projecting the ray AB just outside of the optical path to the FPA 60, preferably approximately 5 degrees away, the vertex of the reflecting surface of the cold shield to be created does not optically interfere with the optical path to the FPA 60 due to manufacturing tolerances.

In order to construct the cold shield, an arbitrarily chosen vertex point B is selected along the ray path AH, preferably offset approximately 250 μm (0.010 inches) from the optical path AH. From this point, B, a ray is projected to the far side of the detector or FPA 60, shown as point C. The line BC represents a purely geometrical reference from which a planer upwardly facing surface of the cold shield to be created will be illuminated by a reflection from ray AB. The angle formed by AB and BC is then bisected to form an angular bisector BD. A line, BF, is then taken perpendicular to line BD. This line, BF, defines the upward facing surface of the interior of the cold shield at this vertex point, B.

The line BF is then rotated slightly clockwise, on the order of approximately 5 degrees, to a new position BF'. Such a slight rotation of the line BF compensates for manufacturing tolerances and provides for a more workable design which is less susceptible for low angle scattering effects of the cold shield interior coating which is added after the cold shield has been constructed. The downward facing surface is then created by projecting a ray GA, from point G to point A, which defines the minimum ray which could illuminate the interior of the cold shield to be created. The ray which defines one of the limits of the optical path from point A to the near side of the FPA, or the closest point just outside of the optical path, point H, defines a line or trace AH.

The angle formed by lines GA and AH is bisected forming an angular bisector AJ. A line AK is constructed perpendicular to line AJ, which represents the downward facing surface of the bellows cold shield to be created at a point above the vertex point B. The line AK is rotated slightly counterclockwise, on the order of approximately 5 degrees, to a new position AK' for the reasons previously explained with reference to line BF'. In positions directly adjacent to the entrance aperture of the cold shield, illustrated as line GA, line AK can be rotated to a position perpendicular to the optical axis of the system, AK".

This method of forming the entrance aperture of the cold shield, rotating line AK to a position perpendicular to the optical axis, illustrated as line AK", results in a geometry which while creating a bellows cold shield that is more easily fabricated and, therefore, less costly, will result in a blunt edged aperture being created which can provide a small reflection surface which will contribute to the overall optical "noise" of the system. The actual portion of the bellows created by this method as described, is determined by the point A, the intersection of either one of lines AK' or AK", whichever is chosen, and line BF'. The choice of using one of either lines AK' or AK" is dependent upon the particular application for the cold shield. As previously described, using line AK" results in a cold shield which is less costly to construct, but results in the creation of a blunt edged aperture. Using line AK' creates a cold shield which has better optical performance, but is more difficult to fabricate and, therefore, more costly.

The next lower bellows section is formed in a similar manner until the entire geometry has been completed for the cold shield to be created, by selecting another vertex point and repeating the above procedure. The frequency of the bellows vertices can be increased or decreased, depending upon which aspect of the system performance is more important. A greater number of bellows vertices will result in a lower mass cold shield, but will provide more vertices for light to reflect from in a low scatter fashion thereby increasing the optical "noise" in the system. A fewer number of bellows vertices provides for a lower optical "noise" design, but will increase the thermal mass of the cold shield from the increasing diameter at which the downward and upward facing surfaces intersect.

The selection of the number of bellows vertices design parameter is determined by such things as the target image intensity, the FPA sensitivity, the cool down time desired, dynamic stability and the other components of the system in which the apparatus is to be utilized which may be impacted by these aspects of the cold shield design.

Figure 2:
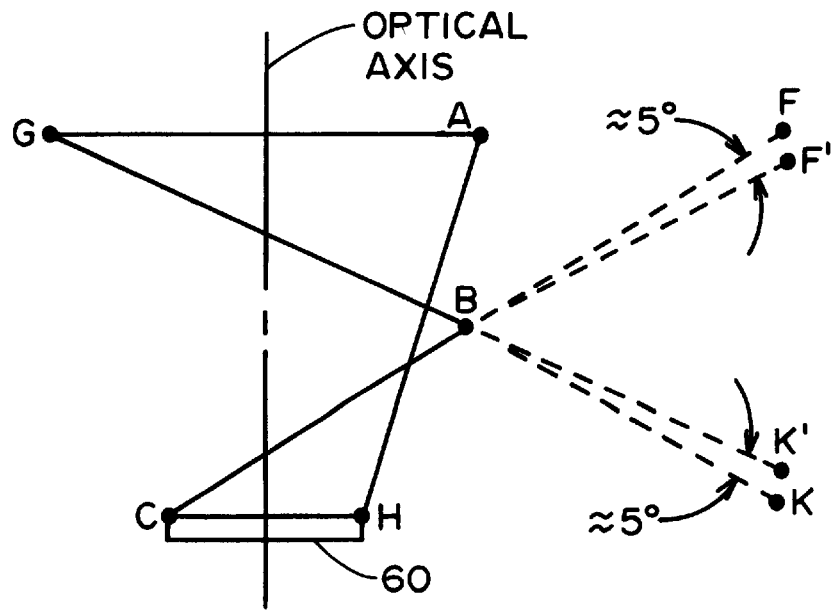
FIG. 2 is a ray trace diagram to illustrate an alternative embodiment of designing the predetermined geometrical surface to redirect unwanted IR energy from reaching the FPA by reflecting the undesired light energy away from the FPA.

Referring now to the illustration in FIG. 2, this method for designing the bellows cold shield involves the use of geometries which cannot directly illuminate the FPA 60 regardless of the direction of the incoming stray radiation, or "noise". These geometries are calculated in the following manner. An upward facing surface is created by drawing a line from the far side of the detector or FPA 60, point C, to an arbitrary vertex point, point B preferably offset from the optical path defining line AH by approximately 250 µm (0.010 inches) for the reason previously discussed with reference to the other method illustrated with reference to FIG. 1. This line, CB, is then extended to a position beyond point B, an arbitrary position identified as point F. The portion of the line defined from B to F is then rotated slightly in a clockwise direction, approximately 5 degrees, to a position F' for the reasons previously described with reference to lines BF' and AK' of the previous embodiment. A downward facing surface can be created by drawing a line from the far side of the optical path entrance aperture, point G, to the vertex, point B, defining a line GB. This line GB is extended to an arbitrary position beyond point B, identified as point K. The portion of the line from point B to point K is then rotated in a counterclockwise direction to a new position K' for the reasons previously explained with reference to F'.

The downward facing surface located at the entrance aperture of the cold shield, illustrated by line GA, can be created by drawing a line perpendicular to the optical axis, or in a manner as explained in the first method, depending upon the particular application for which the cold shield is to be used and the economics of manufacture associated therewith. The overall bellows shape is determined by tracing the outline defined by the intersections of the downward and upward facing lines and their originating vertices. These designs provide the highest degree of stray light rejection since the performance is not as strongly affected by the scattering and/or absorption characteristics of the coatings used since there is no direct or single scatter path of illumination of the detector or FPA 60. The number of vertices in these designs can impact the optical performance of the system in a manner similar to the previous method. These designs can also tend to be less dynamically and statically stable due to the high aspect ratios of the cavities formed by the downward and upward facing surfaces.

Both of these design methods generate a geometry for forming a mandrel which will produce a cold shield bellows having the maximum macroscopic reflection rejection performance of a cold shield while providing the lowest mass and fabrication costs.

Figure 3:
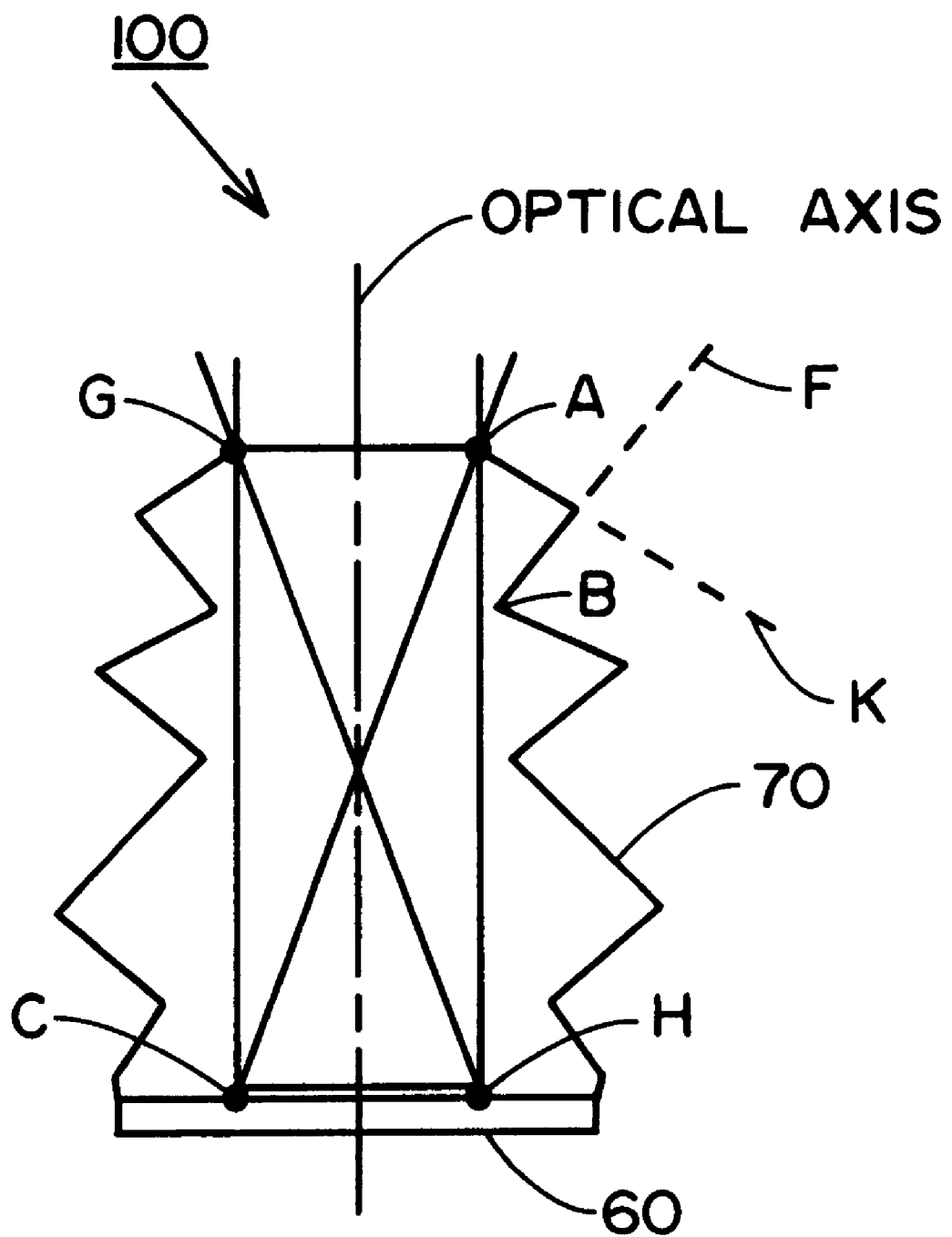
FIG. 3 is a mechanical schematic of a cold shield constructed in accordance with the method of designing illustrated by the ray trace diagrams of FIGS. 1 or 2 to illustrate an IR detector system and the manner in which the cold shield reflects the unfocused radiant energy from the system so that only the focused radiant energy impinges upon the FPA and any unfocused radiant energy will be reflected away or absorbed by the interior of the cold shield.

Referring now to FIG. 3, there is illustrated an IR detector system 100 including an optical system whereby IR energy to be detected is focused onto a detector or FPA 60, and a cold shield 70. The cold shield 70 is manufactured by an electroforming process whereby a mandrel, constructed in accordance with one of the methods described above, is used to form a bellows machined from aluminum and plated with layers of other metals such as nickel, copper, nickel-cobalt, or combinations of such metals to insure sufficient adhesion of an exterior layer of either gold, copper and/or nickel.

The formation of the mandrel, by which the bellows is created, performs the macroscopic stray IR rejection as a result of the geometry disclosed above with reference to FIGS. 1 & 2. The bellows is created by the machining of the mandrel, upon which the bellows is formed, in accordance with either of these two design methods. The angles and the spacing of the bellows shape is determined by using either one of the previously described two methods.

In forming such a mandrel, it has been found that coating the aluminum mandrel with a zinc deposit and/or copper strike prior to the actual forming is preferable so that the electrode-deposited gold will adhere to the mandrel surface and thereby prevent loss of adhesion during electrodeposition or post-plate machining. A gold exterior layer is preferred because of its low external emissivity.

After such plating of the mandrel, the critical features of the cold shield are machined, and the mandrel dissolved, generally by using an alkaline solution such as sodium hydroxide. The zinc and/or copper strike coating is the stripped off the interior of the cold shield after the mandrel has been dissolved, leaving only a thin shell of low mass as a structural part. The interior of the cold shield so formed is then blackened by painting or through the deposition or conversion of the interior surface to a material which has a high emissivity, such as an oxide layer. In this manner the mass of the cold shield is kept as low as possible, the rejection/absorption characteristics of the interior are high and the emissivity of the exterior is as low as possible.

When preparing the mandrel designed in the manner described above, and upon which the cold shield bellows is formed, it has been found that the microscopic characteristics are enhanced by roughening the surface of the mandrel, prior to plating it with the intermediate metal layers in preparation for the plating of the gold exterior. Such roughening of the surface can be effected by air abrading or grit blasting the mandrel with a sharp, hard grit such as Silicon Carbide or other such medium to replicate a microrough surface on the interior of the cold shield bellows after the mandrel has been dissolved. This roughening may also be effected by a selective etching of the mandrel in an acidic or alkaline solution. The intent of the roughening process is to produce a randomly oriented roughness on the surface with a non-directional spacing and peak to valley amplitude on the order of at least the longest wavelength of radiation to be absorbed.

For a system operating in the 3 to 5 µm wavelength spectrum, a roughness of approximately 25 µm (0.001 inches) to approximately 250 µm (0.010 inches) has been found to be suitable. These microscopic cavities so formed act as "energy wells" which nearly completely capture any energy which enters them by providing for many bounces to occur within them, thereby absorbing energy upon each bounce, which greatly increases the apparent emissivity of the surface on which they are formed. With such a construction as described utilizing both macroscopic and microscopic performance characteristics, a very high performance cold shield can be constructed which does not need a high emissivity coating on the bellows interior. Coatings with only moderate emissivity on the order of 0.6 to 0.8 created with this combination of macroscopic and microscopic geometry can provide very low net rejection as required for use in extremely sensitive IR detecting systems.

While this invention has been described in the specification and illustrated in the drawings with reference to preferred embodiments, the structures of which have been disclosed herein, it will be understood by those skilled in the art to which this invention pertains that various changes may be made and equivalents may be substituted for elements of the invention without departing from the scope of the claims. Therefore, it is intended that the invention not be limited to the particular embodiment disclosed in the specification and shown in the drawing as the best mode presently known by the inventor for carrying out this invention, nor confined to the details set forth, but that the invention will include all embodiments, modifications and changes as may come within the scope of the following claims:

It is claimed:

1. A bellows shaped cold shield for reflecting stray infrared energy outside of a predetermined optical path from reaching a focal plane array and absorbing any such stray infrared energy which is not so reflected comprising a plurality of conjoined infrared energy reflecting surfaces positioned at angles relative to each other forming a bellows shape for reflecting infrared energy outside of a predetermined optical path from reaching a focal plane array, and said plurality of conjoined infrared energy reflecting surfaces each having a randomly oriented surface roughness with a non-directional spacing and peak to valley amplitude of at least the approximate wavelength of the infrared radiation to be absorbed.

2. The bellows shaped cold shield of claim 1 wherein said surface roughness is from approximately 25 μm (0.001 inches) to approximately 250 μm (0.010 inches).

3. The bellows shaped cold shield of claim 1 wherein said surface roughness is effected by air abrading or grit blasting with a sharp and hard grit.

4. The bellows shaped cold shield of claim 3 wherein said sharp and hard grit is Silicon Carbide.

5. The bellows shaped cold shield of claim 1 wherein said surface roughness is formed by a selective etching.

6. The bellows shaped cold shield of claim 5 wherein said selective etching is by the use of an acidic or alkaline solution.

7. The bellows shaped cold shield of claim 1 wherein said surface roughness is blackened.

8. The bellows shaped cold shield of claim 7 wherein said blackening is effected by painting said surface.

9. The bellows shaped cold shield of claim 7 wherein said blackening is effected by the deposition or conversion of said surface to an oxide layer.

10. A method of forming a bellows shaped cold shield for reflecting stray infrared energy outside of a predetermined optical path from reaching a focal plane array and absorbing any such stray infrared energy which is not so reflected comprising forming a bellows shaped mandrel upon which a bellows shaped cold shield is to be created by conjoining a plurality of aluminum surfaces positioned at an angles relative to each other forming a bellows shape for reflecting infrared energy outside of a predetermined optical path from reaching a focal plane array, plating said bellows shaped mandrel with an exterior layer of either gold, copper and/or nickel, dissolving the bellows shaped aluminum mandrel forming a bellows shaped cold shield in the configuration of the bellows shaped mandrel, and roughening the interior of said bellows shaped cold shield so formed to produce a randomly oriented surface roughness with a non-directional spacing and peak to valley amplitude of at least the approximate wavelength of the infrared radiation to be absorbed.

11. The method of claim 10 wherein said surface roughness is from approximately 25 μm (0.001 inches) to approximately 250 μm (0.010 inches).

12. The method of claim 10 wherein said surface roughness is effected by air abrading or grit blasting with a sharp and hard grit.

13. The method of claim 10 wherein said surface roughness is effected by air abrading or grit blasting with a sharp and hard grit.

14. The method of claim 13 wherein said sharp and hard grit is Silicon Carbide.

15. The method of claim 10 wherein said surface roughness is formed by a selective etching.

16. The method of claim 15 wherein said selective etching is by the use of an acidic or alkaline solution.

17. The method of claim 10 wherein said surface roughness is blackened.

18. The method of claim 17 wherein said blackening is effected by painting said surface.

19. The method of claim 17 wherein said blackening is effected by the deposition or conversion of said surface to an oxide layer.

20. The method of claim 10 including the step of coating said bellows shaped mandrel with a zinc deposit and/or a copper strike prior to plating said bellows shaped mandrel with an exterior layer of either gold, copper and/or nickel, and stripping the zinc and/or copper strike off of the interior prior to dissolving the bellows shaped aluminum mandrel.

* * * * *